United States Patent

Moffitt

[15] 3,692,936

[45] Sept. 19, 1972

[54] ACOUSTIC COORDINATE DATA DETERMINATION SYSTEM

[72] Inventor: John Stuart Moffitt, San Jose, Calif.

[73] Assignee: International Business Machines Corporation, Armonk, N.Y.

[22] Filed: June 18, 1970

[21] Appl. No.: 47,397

[52] U.S. Cl. ....................178/18
[51] Int. Cl. ....................G08c 21/00
[58] Field of Search ...............33/1 P; 178/18, 19, 20; 340/16

[56] References Cited

UNITED STATES PATENTS

| | | | |
|---|---|---|---|
| 3,535,447 | 10/1970 | Wollrich | 178/19 |
| 2,903,673 | 9/1959 | Harris | 340/8 MM |
| 3,504,334 | 3/1970 | Turnage | 178/18 |
| 3,134,099 | 5/1964 | Woo | 178/18 |
| 3,156,766 | 11/1964 | Stamps | 178/18 |
| 3,439,317 | 4/1969 | Miller | 178/18 |
| 3,121,955 | 2/1964 | King | 33/1 P |
| 3,176,263 | 3/1965 | Douglas | 178/18 |

*Primary Examiner*—Kathleen H. Claffy
*Assistant Examiner*—Thomas D'Amico
*Attorney*—Hanifin and Jancin and George E. Roush

[57] ABSTRACT

The use of graphical display devices in conjunction with digital computer and data processing systems is enhanced by an acoustic coordinate determinating system providing a completely unobstructed view of the display. A transparent sheet of suitable material, such as glass, arranged in front of the display and acoustic waves are propagated in the material from a spaced pair of acoustic wave radiating elements radiating acoustic energy in the sheet at a frequency of the order of 185 kHz. An acoustic probe tuned to the frequency of the radiation is touched to the material for developing currents on arrival of the radiated waves. These currents control counting circuitry advanced by pulses derived from a 2.5 MHz oscillator under control of circuitry comprising conventional gating circuits and latches for manifesting values proportional to the distances of the probe at any given point in the display with respect to the two transducers. The conversion of counting circuitry values to $r$, $\theta$ or X-Y coordinates is done under programmed computer control if desired.

13 Claims, 5 Drawing Figures

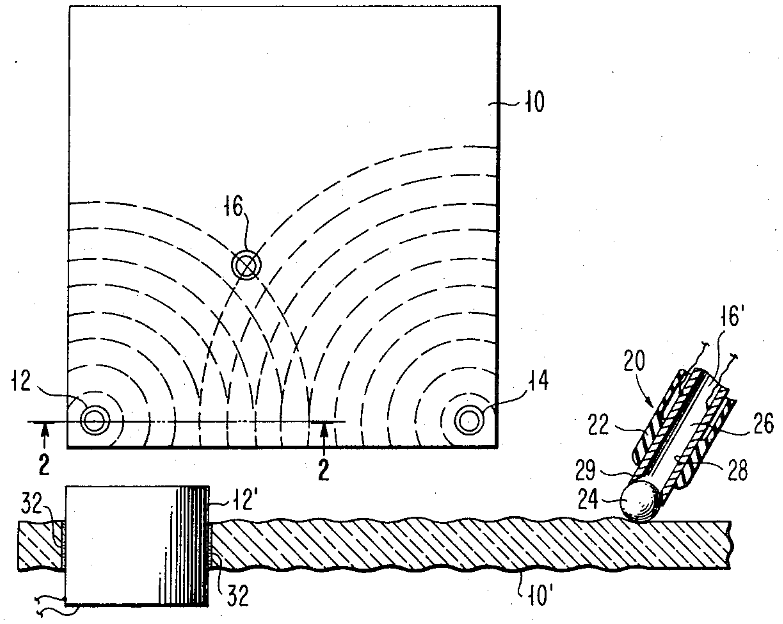
FIG. 1, FIG. 2
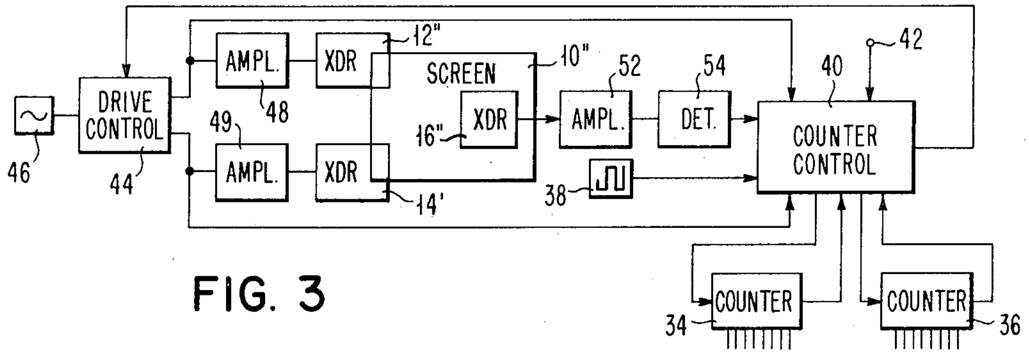
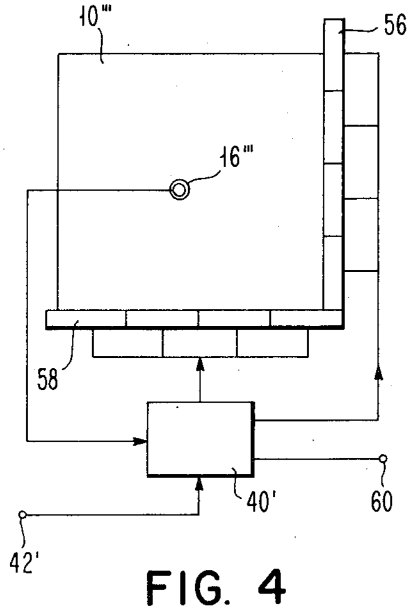
FIG. 4
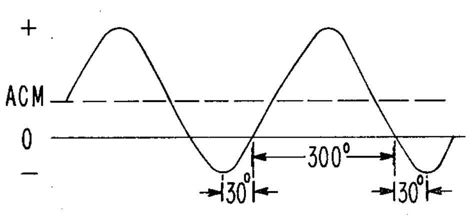
FIG. 6
INVENTOR.
JOHN S. MOFFITT
BY George E. Roush
ATTORNEY

ACOUSTIC COORDINATE DATA DETERMINATION SYSTEM

The invention involves the same general field of the graphical display coordinate data determining art as that disclosed in the co-pending U.S. Patent application Ser. No. 787,421 of Richard Dean Weir filed on Dec. 27, 1968 and thereafter issued on Mar. 16, 1971 as U.S. Pat. No. 3,571,510 for "Coordinate Data Determination System," assigned to the International Business Machines Corporation. Reference to this United States Patent Application will be helpful in the understanding in the background of the invention.

The invention relates to graphic displays used in conjunction with electronic computing and data processing systems, and it particularly pertains to the determination of coordinates of random loci of points within a predetermined planar area for use with digital systems; however, it is not limited to such systems.

In the contemporary information handling art, attention is being directed to the use of graphic displays for exhibiting a large quantity of information in readily assimilated form for use, for example, in teaching and learning, engineering and technical designing, vehicular traffic detecting and controlling, weather forecasting, and the like. The development of this art has reached a level at which it is particularly desirable that data from such a display be reduced readily and reintroduced into an electronic information handling system, particularly a digital computing and/or data processing system.

Prior art approaches to this problem applied the principle of resistance and conductive grids and plates similar to those used in early telautograph systems. The grids were made either of fine wire or some transparent material which had sufficient conductivity for the purpose. It has also been suggested that a map or similar display be placed on an opaque metallic plate having means for establishing an electric current gradient thereacross. Transparent dielectric wave guide structures have been suggested having little discontinuity between the separate wave guides so as to be as little objectionable as possible. All of these arrangements suffer from the principal disadvantage that the optical viewing path is deterred at least to some extent. Non-deterring schemes involve "Optical grids" formed by light beams, both in the visible and invisible spectrum, but these schemes are readily disturbed by the interposition of the fingers and like nonprobing elements. Other systems are known for use with cathode ray tube displays wherein a light sensitive probe is placed on the screen of the cathode ray tube and a measure of the loci obtained by measuring the time between the beginning of the cathode ray tube scan and the time it passes the probe. All of these systems mentioned are relatively expensive and most of them are complex except for the CRT-light probe arrangement which, however, is limited to the cathode ray tube display only and therefore somewhat less desirable. The above referenced co-pending patent application Ser. No. 787,421 now U.S. Pat. No. 3,571,510 describes a coordinate data determination system, comprising four elongated electromagnetic energy radiating elements arranged along the side of a rectangle and coupled to a generator of alternating current electric energy of given ultrasonic frequency. Means are provided for coupling the generator alternately to pairs of the radiating elements on opposite sides of the rectangle for radiating electromagnetic energy therebetween. A probe is tuned to the given frequency for detecting the difference in electromagnetic energy radiated from the radiating elements at any point within said rectangle, and circuitry is provided for converting the difference in electromagnetic energy to coordinate indications of the locus of a corresponding point within the rectangle. The radiation varies as the square of the distance from the radiating element. This nonlinearity and the possibility of interference by other such systems in close proximity has led to other schemes. Acoustic energy can be confined to a discretely bounded medium and recognized on the approach of a propagated wave independent of strength. These characteristics have been explored previously. Examples of the prior art in the acoustic approach are found in the following U.S. Patents:

| | | | |
|---|---|---|---|
| 2,405,604 | 8/1946 | Pope | 177–386 |
| 2,406,014 | 8/1946 | Harry | 177–352 |
| 3,121,955 | 2/1964 | King | 33–1 |
| 3,134,099 | 5/1964 | Woo | 340–347 |

and in the technical literature:

J.B. Gunn and K.L. Konnerth; "Acoustical Data Input Panel"; IBM Technical Disclosure Bulletin; Vol. 12, No. 3, August 1969, p. 390.

According to the invention, the objects indirectly referred to hereinbefore and those which will appear as the disclosure progresses are attained in coordinate data determination system comprising a pair of acoustic energy radiating elements spaced apart and bonded in a preferably transparent sheet of isotropic material superimposed on the display. Alternating current of given frequency from a suitable generator is applied to the acoustic energy radiating element for radiating bulk waves in the sheet. A probe tuned to the given frequency is placed in acoustic contact with the sheet to detect the arrival of waves of acoustic energy from the radiating elements at any point on the sheet. Circuitry coupled to the probe is arranged for converting the differences between the locations of the energy radiating devices and the radiation sensing probe to an indication of the ordinates of the location of the point with respect to the acoustic energy radiating elements. The basic coordinate data is determined by measuring the times of propagation of acoustic waves emanating from the emitting transducers to the sensing transducer. With the transducers located at the corners of the sheet, any point (above the common centerline of the transducers) is thus denoted by a unique pair of numbers proportional to the propagation times. Nonlinear to linear data conversion systems are known. Conventional analog to digital data converting circuits, of course, may be used for reducing the analog data to digital data in known fashion. According to the invention, rectangular coordinates are directly generated by a system wherein the isotropic sheet is excited on one edge by one or more acoustic energy transducers propagating a wave in a direction normal to that edge and the sheet is similarly excited at an edge perpendicular to the first edge.

The arrangement according to the invention is enhanced by matching the impedance of the sensing transducer with that of the sheet of isotropic material and the frequency of the acoustic wave energy is adjusted to the resonant frequency of the entire system comprising the emitting transducers, the sheet and the sensing transducer including the tip. Contact preferably is made by a tip on the probing or sensing transducer that is at least semi-spherical and of dimensions less than one-half wavelength of the acoustic wave energy.

Sine wave energy is gated at predetermined intervals to drive the radiation transducers. The gating circuitry is arranged to start the counting circuitry. Thereafter, the wave is detected by the sensing transducer to stop the counting circuitry, thus measuring the propagation time. Direct current biasing of the sine wave is utilized in a manner according to the invention for extending the range of performance and increasing the accuracy with respect to a given frequency of operation. Sensing the arrival of an acoustic wave is thus possible on the first cycle of wave energy received, thereby increasing the accuracy over prior art arrangements. Logical circuitry, mainly comprising AND and OR gating circuits and latches, is arranged to control the system, determine the point at which the probe is located and convert the determination to digital data in accordance therewith. Further, according to the invention the control circuitry is arranged to operate two ordinate determination systems sequentially to provide the coordinate data for electronic computing or data processing circuitry and/or other utilization apparatus in accordance with the use of such data therefrom. The counting circuitry is connected with control circuitry to reset the controls on failure to detect so that no erroneous data is left in the counters and so that the system is not hung up by such failure.

In order that the advantages of the invention may be readily attained in practice, a description of preferred embodiments of the invention is given hereafter, by way of example only, with reference to the accompanying drawing, forming a part of the specification and in which:

FIG. 1 depicts a display screen and acoustic transducers according to the invention;

FIG. 2 is a cross-section drawing of an embodiment of the invention according to FIG. 2;

FIG. 3 is a function diagram of circuitry according to the invention;

FIG. 4 depicts an arrangement with an alternate form of acoustic radiating elements according to the invention;

FIG. 6 is a graphical representation of a waveform generated in the practice of the invention.

Figure 5:
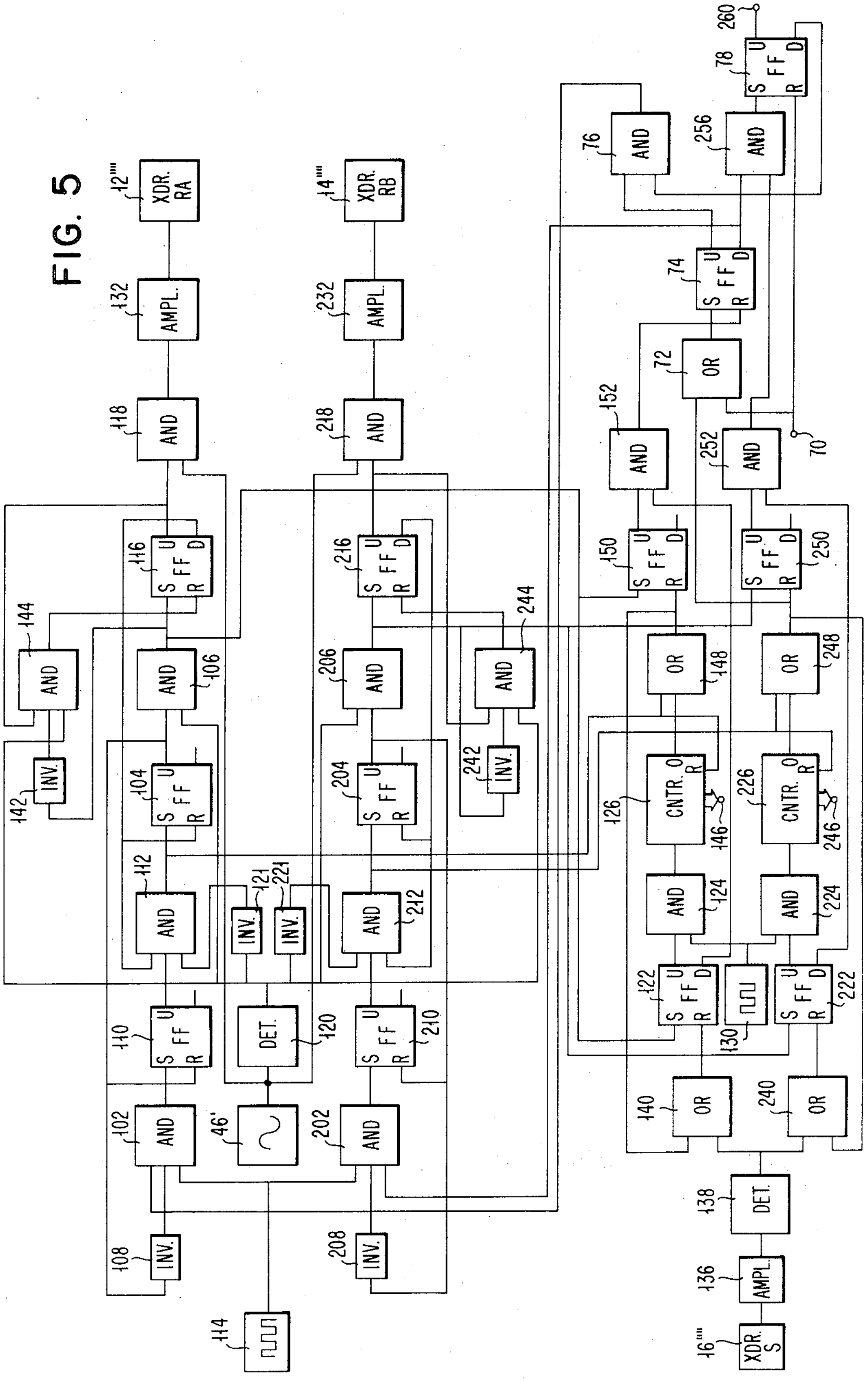
FIG. 5 is a logical circuit diagram of an exemplary embodiment of the invention.

The essential elements of the coordinate data determination system according to the invention are depicted in the diagram of FIG. 1. A sheet of isotropic material, such as glass, for example, is placed in front of a graphic display (not shown) bearing information with reference to which some form of coordinates are desired, for example, the map. A pair of acoustic energy radiating elements 12, 14, which will be more fully described hereinafter, are energized by an alternating current generator (not shown) of conventional form for the radiation of acoustic energy in the sheet 10 outwardly from the elements 12 and 14. Two analog values indicative of the location of a point within the area of the sheet 10 is obtained by means of another acoustic transducer 20 acting as an acoustic energy probe. The probe transducer 16 is tuned to a natural frequency of the order of the frequency of the generator supplying acoustic energy to the acoustic wave radiating elements 12 and 14. Preferably, the resonant frequency of the assembly comprising the sheet 10, the transducer 16 and a contact tip 24 (described hereinafter) is tuned to the frequency of the acoustic wave in the sheet 10.

The indication of the location of the probe transducer 16 on the sheet 10 is established by measuring the time of transit of an acoustic wave from one transducer radiating element 12 and the time of transit of a similar acoustic wave from the other acoustic wave radiating transducer 14 to the probe transducer 16. With the radiating transducers 12 and 14 located in adjacent corners of the isotropic sheet 10, as shown, the location of the probe transducer 16 is represented by a unique pair of transit times for all possible locations of the probe 20 in the sheet 10 above the center line of the acoustic wave energy radiating transducers 12 and 14. This upper area constitutes the useful portion of the sheet 10.

According to the invention, the arrival of an acoustic wave is detected on the very first cycle of the wave front as illustrated in FIG. 2 showing a portion in cross-section of an isotropic sheet 10' and one acoustic wave transducer 12' radiating a bulk wave to a probe 20. The sheet 10' may be of an isotropic material and calibrated according to an empirical investigation where necessary. Preferably, the sheet 10' is made of isotropic material as such is commercially available in quantity at low cost and correction is unnecessary. Plastic material, for example Lucite (a registered trademark of the E.I. duPont de Nemours Co.) and similar materials, have relatively high acoustic attenuation, and relatively high driving power is required. Glass has been found entirely satisfactory and sufficiently strong for the purpose. Clear glass is desirable in most applications so that the display may be seen through the sheet. Frosted glass is suitable for rear-projection optical displays, but a separate clear glass overlay is inexpensive and can be removed for use with other displays. The latter is preferred for Cathode Ray Tube (CRT) displays, although the faceplate of a CRT can be excited by acoustic energy. The screen can be made of safety glass and serve as the CRT protective shield at the same time. The transducer 12' is fastened in the glass sheet 10' by means of an epoxy 32 which sets relatively hard so that the transducer is directly bonded to the sheet 10'. The probe 20 comprises a casing 22 (a portion only of which is shown in cross-section) of generally tubular configuration suitable for holding in the hand in the manner of more conventional probes. The probe casing 22 is molded of relatively limber plastic about an acoustic transducer 16' of generally tubular configuration. Alternately, a more rigid casing can be cemented with a relatively soft epoxy to the transducer 16'. The transducer 16' comprises a tubular body 26 of piezoelectric material having a cylindrical inner conductor 28 and a cylindrical outer conductor 29 forming the electrodes of the transducer 16'. Transducers of the type having lead-zirconate-titanate body and electrodes formed by a process which ultimately leaves a silver coating on the body (such as the transducers available commercially as Clevite PZT-5) have been found quite satisfactory in operation. Preferably the transducer 16' is fitted with a tip 24 of generally spherical configuration. The tip 24 is preferably ceramic or a gemstone, for example, ruby or saphire; metal balls are undesirable because the acoustic impedance is so different from the medium, for example glass and that of the piezoelectric material. The tip 24 is cemented to the tubular body 26 by an epoxy cement (for example, the type known as 3-M Structural Adhesive). The tubular body 26 is champfered slightly to accept the ball 24 more readily. Alternately, tip 24 may be in the general form of a hemisphere having the flat side cemented to an unchampfered end of the tubular body 26. The ball configuration is preferred for several reasons. It provides more uniform contact and is less critical in angle of attack. Economically, such ceramic and gemstone spheres are commercially available in quantity at low cost. A much closer match of impedances of the gemstone and glass affords greater efficiency since reflected energy due to mismatch is greatly reduced. Preferably the diameter of the ball 24 is less than one-half wavelength of the acoustic energy. The transducer 12' is of similar construction to that of transducer 16' except for dimensions. The dimensions have some relationship to the dimensions and the material of the sheet. For glass thickness of the order three-sixteenths of an inch, the latter transducer has an outside diameter of the order of one-eighth inch while the acoustic energy radiating transducer 12' (and a corresponding transducer 14', not shown) has an outside diameter of the order of one-half inch.

An alternating potential applied across the piezoelectric tubular body at the inner and outer electrodes is effective to shorten and expand the body and lengthen and alternatingly contract it in accordance with the rise and fall of the potential so that a bulk wave is radiated from the transducer 12' to the glass sheet 10' as shown. When the bulk wave strikes the ball tip 24 of the probe 20, the shortening and expanding and alternate lengthening and contracting of the sensing transducer 16' generates an alternating potential of the same frequency across the electrodes 28 and 29. According to the invention, sufficient potential is generated in the first cycle of the bulk wave in the isotropic sheet 10 for operating the electronic circuitry later to be described. The bulk wave does continue in the sheet 10' to the edges and is then reflected back into the sheet. This wave motion is damped so that it travels back and forth only a few times. This inherent reflection is of no advantage, however, the invention avoids erroneous indications by spacing the drive pulses in time so that subsequent waves do not encounter reflected waves previously generated.

A functional diagram of electronic circuitry for determining coordinate data is shown in FIG. 3. The coordinates of a location of the probe 16 are obtained from a pair of counters 34 and 36 to which timing pulses obtained from a timing pulse generator 38 are applied by means of counter control circuitry 40. A counter control voltage level calling for coordinate determination is applied at counter control level terminals 42. This voltage level may be obtained from an associated computer programmed to call for activation at a predetermined time in the program. The level may be derived from a circuit closed by an activating switch in the probe casing 22 arranged to be actuated by pressure of the probe tip 24 against the glass sheet 10 as is conventional with probes for other coordinate data determination systems. The switch may be actuated by the depression of a push-button by the operator of the probe when an indication of the coordinates is desired. When an activation level potential is applied at the terminals 42, drive control circuitry 44 starts the counters 34 and 36 sequentially gates sine wave voltage from a continuously running sine wave generator 46 sequentially to amplifiers 48 and 49 for powering acoustic wave radiating transducers 12'' and 14'' in turn. Counter 34, amplifier 48 and transducers 12'' and 16'' determine one ordinate and thereafter the counter 36, amplifier 49 and transducers 14'' and 16'' determine the coordinate. The transducers 12'' and 14'' are acoustically coupled to the screen 10'' as described hereinbefore. Likewise a sensing transducer 16'' is acoustically coupled to the screen 10'' and electrically coupled to an amplifier 52, part or all of which preferably is incorporated in the probe casing 22. A detector 54 is coupled to the amplifier 52 for detecting the first cycle of acoustic wave energy striking the sensing transducer 16'' for transmitting a control pulse to the counter control circuitry 40. The latter circuitry is arranged to stop the first counter 34 at a count proportional to the distance of the sensing transducer 16'' from the radiating transducer 12'' after which the other amplifier 49 is activated and the second counter 36 is stopped at a count proportional to the distance of the sensing transducer 16'' from the other radiating transducer 14''. For many applications the two counts in counters 34 and 36 are sufficient for the purpose. If other coordinates, such as Cartesian coordinates, are desired conversion circuitry of conventional configuration may be employed. For the special case of polar coordinates, the arrangement shown in FIG. 4 is practicable for all but the applications requiring extremely high accuracy. Here a sheet of glass or other isotropic material 10''' has two groups of planar radiating transducers 56 and 58 bonded directly to the sheet 10''' along perpendicular edges. These transducers radiate a bulk wave in the glass sheet 10''' substantially parallel to the originating edge although some tendency toward curvature of the wavefront will be evident. Extending the transducer beyond the edges will reduce this deleterious effect. The arrangement differs from the prior art arrangement of U.S. Pat. No. 3,134,099 in that no refracting block of lucite is used between the sheet and the transducers. This block is used to develop surface waves rather than bulk waves and the former are less effective requiring more transducers for a given edge dimension and the like. For many applications, the linearity obtainable will be sufficient. As before, an enabling level at terminals 42' starts control circuitry 40' for sequentially delivering pulse control levels over an output line leading to terminal 60 for application to counter circuitry of conventional form for directly indicating Cartesian coordinates.

A logical diagram of a complete system having all of the features according to the invention and comprising a minimum of circuitry is given in FIG. 5. As shown, the system comprises two main portions for the driving and sensing functions with control circuitry interposed in the two portions in the most efficient manner. As shown, the system can be used as part of a Computer Assisted Instruction (CAI) system or as a stand-alone machine with a minimum of additional but conventional equipment. When it is desired to determine the coordinates of a point on the screen, the probe containing a sensing transducer 16'''' is placed in contact with the screen and a request level pulse is applied at terminals 70. This latter pulse may be applied in response to the operator pressing the probe against the sheet or a push-button or a programmed computer closing a circuit according to predetermined program for momentarily applying a potential level which will pass through an OR gating 72 and set a bistable reciproconductive circuit or "flip-flop circuit" 74.

Because of the gross inconsistency with which the terminology relating to the many types of "multivibrators" and similar circuits is used, the less frequently but much more consistently used term "reciproconductive circuit" will be used in the interest of clarity as a base for defining the terminology used hereinafter. As employed herein, the term "reciproconductive circuit" is construed to include all dual current flow path element (including vacuum tubes, transistors and other current flow controlling devices) regenerative circuit arrangements in which current alternates in one and then the other of those elements in response to applied triggering pulses. The term "free running multivibrator" is sometimes applied to the "astable reciproconductive circuit" which is one in which conduction continuously alternates between the elements after the application of a single triggering pulse (which may be merely a single electric impulse resulting from closing a switch for energizing the circuit). Such a circuit oscillates continuously at a rate dependent on the time constants of various components of the circuit arrangement and/or the applied energizing voltage. The term "monostable reciproconductive circuit" will be used to indicate such a circuit in which a single trigger is applied to a single input terminal to trigger the reciproconductive circuit to the unstable state once and return. This monostable version is sometimes called a "single-shot circuit" in the vernacular principally because of erosion of an earlier used term "flip-flop" and because it is shorter than the term "self-restoring flip-flop circuit" later used in an attempt to more clearly distinguish from the term "bistable flip-flop circuit" employed even later. "Bistable reciproconductive circuits" are divided into the "binary reciproconductive circuit" which has a single input terminal to which triggering pulses are applied to alternate the state of conduction each time a pulse is applied. Such a circuit is now frequently referred to as a "binary flip-flop." The "bistable reciproconductive circuit" having two input terminals between which successive triggers must be alternately applied to switch from one stable state to the other has been called both a "flip-flop" and a "lockover circuit." This version hereinafter will be referred to as a "bilateral reciproconductive circuit" or as a "flip-flop circuit".

The status reciproconductive circuit or flip-flop circuit 74 in the operate state enables an AND gating circuit 76 along with the idle terminal output of another bilateral reciproconductive or flip-flop circuit 78 which has been reset by the request level pulse at the terminals 70. The output of the AND gating circuit 76 arms a three input AND gating circuit 102 preparatory to actuating the drive for acoustic wave radiating transducer 12''''. The AND gating circuit 102 should be enabled only when a flip-flop circuit 104 is down so that the following AND gating circuit 106 is not enabled. This is the normal condition for proper operation, and it is assured by applying the output of the flip-flop circuit 104 to the AND gating circuit 102 by way of an inverting circuit 108. Alternatively, AND gating circuit 102 may be conditioned by direct connection to the down terminal of the flip-flop circuit 104, however, the up terminal of the flip-flop circuit 104 is brought to another reciproconductive circuit or flip-flop circuit 110 reset terminal for disabling another AND gating circuit 112. Because AND gating circuits with one or more inverters integrated in the circuitry are commercially available, the wiring is simplified by using an inverting circuit 108. The arrangement of the AND gating circuit 102 for setting the flip-flop circuit 110 in turn enabling the AND gating circuit 112 for setting the flip-flop circuit 104 limits the enabling of the AND gating circuit 106 to a single cycle of a square wave probing rate generator 114. This probing rate generator 114 may be any conventional astable reciproconductive circuit of known configuration. The time constants for probing rate generator 114 are chosen to allow sufficient time for probing the radiation of one wave from a radiating transducer to the remote edge of the screen. Operation at 40 Hz allows 25 milliseconds for probing and the natural damping of the waves to an ineffective level after which operation is concluded. This frequency is related to the reverberation time of the screen. Before the output of AND gating circuit 106 can be applied to set a following reciproconductive circuit 116, the latter must be in the off condition, which is assured by applying the off output to the AND gating circuit 112. A sine wave generator 46' of conventional circuit configuration is the prime source of oscillations for driving the radiating transducers 12'''' and 14''''. This generator produces an output of 150–250 KHz; the frequency is related to the thickness of the screen acting much as a waveguide. For glass three-sixteenths of an inch thick, 185 KHz is quite satisfactory. This wave is applied to one terminal of an AND gating circuit 118 in preparing for ultimately driving the transducer 12''''. It is also used in controlling the operation of the system over part of each cycle of the wave. A detector 120 is coupled to the generator 46' for producing a gating wave of square waveform over at least one-half of each cycle, say the positive going half. A conventional threshold detector circuit is advantageous because it delivers a fairly square wave output for sine wave input. According to the invention improved results obtainable with commercially available circuit components biasing the detector circuit 120 as shown in FIG. 6 to provide a gating wave over 300° of each cycle. The reciprocal of this wave is applied to the AND gating circuit 112 (FIG. 5) by way of an inverting circuit 121. This is to inhibit the AND gating circuit 112 on the driving portion of the cycle but to allow the AND gating circuit to set up the associated circuitry on the preceding non-driving portion of the cycle of the oscillator 46' wave. The AND gating circuit 106 has now acted through the flip-flop circuit 116 to enable the AND gating circuit 118 for driving the first radiating transducer 12''''. At this time, the AND gating circuit 106 is effective to set two bilateral reciproconductive or flip-flop circuits 122 and 150 in the distance determining portion of the circuitry. The up terminal of the flip-flop circuit 122 enables an AND gating circuit 124 having an output line connected to a counting circuit 126. The latter counter 126 is incremented by means of pulses obtained from a clock or timing wave generator 130. For the example shown, this timing wave generator 130 comprises a conventional astable multivibrator operating at a frequency of the order of 2.5 MHz. The frequency is related to the size of the screen and the damping factor of the material, as well as the resolution desired. Alternately, the clock pulse train can be obtained from an associated computer or data processing unit, if desired.

Counter 126 is running and the output of AND gating circuit 118 is a positive going portion of a sine wave of sufficient amplitude to excite an amplifying circuit 132 of conventional configuration for driving an acoustic wave radiating transducer 12''''. This radiating transducer is acoustically coupled through the acoustic wave propagating sheet to the sensing acoustic wave transducer 16''''. When the acoustic wave reaches the sensing transducer 16'''' a low electric potential is generated and amplified in an amplifier 136. The output of the amplifier 136 is applied to the threshold detecting circuit 138, which may be very much like that of circuit 120. The detected level from the detector 138 is applied through an OR gating circuit 140 to reset the reciproconductive or flip-flop circuit 122 stopping the counter 126. The opening of the AND gating circuit 124 removes the input pulses in effect. The output of AND gating circuit 106 was applied through an inverting circuit 142 to an AND gating circuit 144. This AND gating circuit 144 is effective to test the set up on the cycle of the oscillator 46' preceding the driving cycle. Also applied to this AND gating circuit 144 are the output of the threshold detector circuit 120 and the flip-flop circuit 116 which is then reset by the output from AND gating circuit 144. This now isolates the transducer 12'''' from the generator 46' at the end of a single cycle of driving voltage. The output terminals 146 of the counter 126 now contains a number proportional to the distance between the transducers 12'''' and 16''''. In the vent of an overflow of the counter 126, a lead from the overflow terminal of that counter to an OR gating circuit 148 will apply a potential to the OR gating circuit 140 to reset the flip-flop circuit 122 preventing any counting from taking place. At the time the flip-flop circuit 122 was set by the output of AND gating circuit 106, another bilateral reciproconductive or flip-flop circuit 150 was set and AND gating 152 is effective to reset the status flip-flop circuit 74 at the end of the counting cycle. The off terminal of the status flip-flop circuit 74 is connected to an AND gating circuit 202 for ultimately driving the other radiating transducer 14'''' in the same manner as described above in determining the distance from the second acoustic wave radiating transducer 14'''' to the probe 14''''. Reference numbers 2XX are used for the circuit components functioning for the transducer 14'''' which are identical to the components for the transducer 12''''. Sensing the wave from the radiating transducer 14'''' continues in the same manner as described hereinbefore in connection with the other transducer. The counter 226 delivers a count at output terminals 146 proportional to the distance between the acoustic wave radiating transducer 14'''' and the sensing transducer 16''''. The counters are reset from AND circuits 112 and 212, respectively. When the AND gating circuit 152 resets the status flip-flop circuit 74, it enabled AND gating 256. AND gating circuit 252 is effective at the end of the counting cycle to bring up the AND gating circuit 256 and set the output flip-flop circuit 78. This output flip-flop circuit 78 then delivers a potential at the output terminals 260 indicating to the computer or the operator that data is ready to be read out of the counters 126 and 226, respectively at any time; the data will not be lost for any reason except for a new "sense" request on the terminals 70. Thus the system described may be time shared with other computer applications.

Because the probe is hand-held, there is a possibility of failure to detect the arrival of an acoustic wave which would result in erroneous data. According to the invention, this is obviated with a counter capacity somewhat greater than the maximum number to be developed and logical circuitry for recycling the system until an acoustic wave from one transducer is detected after which an acoustic wave from the other transducer is detected. The status bilateral reciproconductive circuit 74 is brought to the operating state on the application of a sense request level at the terminal 70. If the data-ready status flip-flop circuit 78 is in the down, the AND gating circuit 76 will be operative to enable the AND gating circuit 102 for ultimate operation of the driving transducer 12''''. As the AND gating circuit 106 comes up, bilateral reciproconductive or flip-flop circuits 122 and 150 will be set to start the first counter 126. On the arrival of the acoustic wave at the probe transducer 16'''', the bilateral reciproconductive circuit 122 will be reset, to close the AND gating circuit 124 and thereby stop the counter 126. An active down level from the flip-flop circuit 122 and the active up level from the other flip-flop circuit 150 will activate the AND gating circuit 152 for resetting the status flip-flop circuit 74. This completes the first count and the second count is begun by applying the down level from the status flip-flop circuit 74 to the AND gating circuit 202 for ultimate energization of the driving transducer 14''''. The data-ready flip-flop circuit 78 is till in the idle state. In similar fashion to that described above, the wave from the other radiating transducer 14'''' on arriving at the probe transducer 16'''' will be detected by the detector 138 acting through the OR gating circuit 240 to reset the flip-flop circuit 222. This will disable the AND gating circuit 224 and stop the counter 226. This will also activate the AND gating circuit 252 which in turn activates the AND gating circuit 256 which had been enabled by the down level of the status flip-flop circuit 74. Activation of the AND gating circuit 256 sets the flip-flop circuit 78 to the operating condition, indicating at terminals 260 that data is ready to be taken from the counters 126 and 226. At the same time, the down level of the ready flip-flop circuit 78 is removed from the AND gating circuit 76 so that the system is held with the data in the counters 126 and 226 as long as necessary for the associated utilization circuitry to call for it. Should the probe transducer 16'''' fail to detect the arrival of one or both of the acoustic waves for any reason, the corresponding counter will overflow. The overflow terminals of the counters are connected through OR gating circuits 148 and 248, respectively, to flip-flop circuits 150 and 250, respectively, for resetting the latter and to the OR gating circuits 140 and 240 for resetting the flip-flop circuits 122 and 222. The flip-flop circuit 150 (and 250) on being reset disables the following AND gating circuit 152 (and 252) so that the status flip-flop circuit 74 remains set in the operate status and the enabling of the AND gating circuit 102 will drive the emitting transducer 12'''' again for another try. If the second counting cycle is valid, the data-ready signal will appear at the terminals 260. If it is not, the overflow from the second counter 226 will reset the flip-flop circuit 250 and the status flip-flop circuit 74 through the OR gating circuit 72 to begin the first cycle counting and detecting again. Only when two successive successful counts have been made will the data-ready appear at the terminals 260. This excess count overflow and automatic reset is also effective if a reflected wave should be detected. With excess count detection on either counter, both are reset and sampling will continue without transmitting erroneous data. Any probe switch of the type described hereinbefore used with this system will not allow erroneous data to be transmitted because the probe switch merely establishes a request for data and a valid detection of two acoustic waves must be made before any data can be transmitted. The threshold level of detector 138 is set to determine arrival of an acoustic wave at the farthest point from the transducer where the wave is most attenuated so that for the greater part of the screen area reflected waves, which have greater attenuation, will not be detected.

The numbers in the counters 126 and 226 are read out in parallel at the terminals 146 and 246 or serially as desired. This is not shown in detail as counters capable of either or both are entirely conventional. Conversion of these numbers to Cartesian coordinates, or polar coordinates, if so desired, is accomplished by conventional conversion circuitry for that purpose in the associated information handling system.

While the invention has been described in terms of preferred embodiments, it should be clearly understood that those skilled in the art will make changes in form and material without departing from the spirit and scope of the invention as defined in the appended claims.

The invention claimed is:

1. A coordinate data determination system comprising a relatively thin sheet of isotropic material, a pair of acoustic wave emitting transducers spaced apart and coupled to said sheet for transducing acoustic waves therein, a sine wave oscillator, said oscillator being biased by a direct voltage at which one portion of each cycle of oscillation is of one polarity different from the other portion and the peak magnitude and time duration of said one portion is greater than that of said other portion, a gating circuit coupled to said sine wave oscillator and to said transducers for alternating said acoustic waves in said material, an acoustic wave sensing transducer for detecting wave fronts from said emitting transducers at any point on said material, circuitry coupled to said gating circuit for measuring the times of propagation of the acoustic waves emanating from said emitting transducers and arriving at said sensing transducer and for converting said time measurements into an indication of the location of said point with respect to that of said emitting transducers, and circuitry wherein said gating circuit is operated at the excursions of a cycle of the sine wave of said oscillator of said one portion.

2. A coordinate data determination system as defined in claim 1 and wherein said greater portion of each cycle is of the order of 300°.

3. A coordinate data determination system as defined in claim 1 and incorporating a pulse voltage generating circuit, two counting circuits, gating circuitry coupling said pulse voltage generating circuit to said counting circuits, a gating control circuit coupled to said oscillator gating circuit and to said gating circuitry for controlling the admission of pulses to said counting circuits and coupled to said sensing transducer for halting the admission of said pulses on receipt of signals therefrom, whereby the numbers of pulses admitted to said counting circuits are indicative of the location of a given point within said sheet.

4. A coordinate data determination system as defined in claim 3 and incorporating circuitry wherein pulses are applied to said counting circuits at the time said emitting transducers are pulsed and are stopped on the sensing of the first cycle of said acoustic waves by said sensing transducer.

5. A coordinate data determination system as defined in claim 3 and incorporating circuitry having constant values wherein said values are chosen such that said system has a damping factor at which the acoustic waves are damped between drive pulses.

6. A coordinate data determination system as defined in claim 3 and incorporating circuitry having constant values wherein said values are chosen such that the frequency of said pulse voltage generating circuitry is of the order of a thousand times greater than the frequency of said sine wave oscillator.

7. A coordinate data determination system as defined in claim 3 and incorporating excess count detecting and automatic counting circuit resetting circuitry.

8. A coordinate data determination system as defined in claim 1 and incorporating circuitry wherein one part of said measuring circuitry is set up on one cycle of oscillation of said sine wave oscillator and one radiating transducer corresponding to said one part is driven on the succeeding cycle.

9. A coordinate data determination system as defined in claim 3 and wherein said counting circuits are operated sequentially.

10. A coordinate data determination system as defined in claim 9 and incorporating circuitry interposed in said system for recycling said counting circuits in event of failure of said acoustic wave sensing transducer to sense the arrival of an acoustic wave.

11. A coordinate data determination system as defined in claim 10 and wherein said counting circuits have overflow indicating terminals coupled to said interposed recycling circuitry for recycling said system on the overflow of one of said counting circuits.

12. A coordinate data determination system as defined in claim 10 and incorporating circuitry for recycling said system upon failure of said sensing transducer to sense the arrival of one wave from each of said radiating transducers.

13. A coordinate data determination system as defined in claim 12 and incorporating bistable circuitry coupled to said recycling circuitry for indicating the availability of data on receipt of one wave from each of said radiating transducers by said sensing transducers.

* * * * *